United States Patent
Kim et al.

(10) Patent No.: US 8,054,975 B2
(45) Date of Patent: Nov. 8, 2011

(54) METHOD AND SYSTEM FOR MANAGING KEY OF HOME DEVICE IN BROADCAST ENCRYPTION (BE) SYSTEM

(75) Inventors: Dae-youb Kim, Seoul (KR); Hwan-joon Kim, Seoul (KR); Maeng-hee Sung, Seoul (KR); Weon-il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1167 days.

(21) Appl. No.: 11/401,404

(22) Filed: Apr. 11, 2006

(65) Prior Publication Data
US 2006/0285694 A1    Dec. 21, 2006

(30) Foreign Application Priority Data

Jun. 16, 2005    (KR) .................. 10-2005-0052050

(51) Int. Cl.
H04L 9/00    (2006.01)
(52) U.S. Cl. .................. 380/278; 713/171
(58) Field of Classification Search .......... 380/278; 713/171
See application file for complete search history.

(56) References Cited

U.S. PATENT DOCUMENTS

| 2004/0120529 A1* | 6/2004 | Zhang et al. ............... 380/278 |
| 2006/0177066 A1* | 8/2006 | Han et al. .................. 380/277 |
| 2006/0236099 A1* | 10/2006 | Jin et al. ................... 713/158 |
| 2007/0044159 A1* | 2/2007 | Ishiguro ...................... 726/27 |
| 2007/0073624 A1* | 3/2007 | Ishibashi et al. ............ 705/53 |
| 2008/0092243 A1* | 4/2008 | Kawamoto et al. ......... 726/27 |
| 2008/0154633 A1* | 6/2008 | Ishibashi et al. ............ 705/1 |

FOREIGN PATENT DOCUMENTS

KR    2003-0019315    3/2003

OTHER PUBLICATIONS

Lotspiech et al., "Anonymous Trust: Digital Rights Management Using Broadcast Encryption." Jun. 2004, Proceeedings of the IEEE vol. 92 No. 6. pp. 1-12.*

\* cited by examiner

*Primary Examiner* — Nasser Moazzami
*Assistant Examiner* — Lisa Lewis
(74) *Attorney, Agent, or Firm* — NSIP Law

(57) ABSTRACT

A method and a system for managing a key of a home device in a broadcast encryption system are provided. A hierarchical structure of a group set comprising a plurality of nodes corresponding to the home server and a plurality of nodes corresponding to the home device is formed. A key set to be allotted to the node set is generated. The node group is allowed to correspond to the key set to generate key-node corresponding information according to a request of the home server.

12 Claims, 4 Drawing Sheets

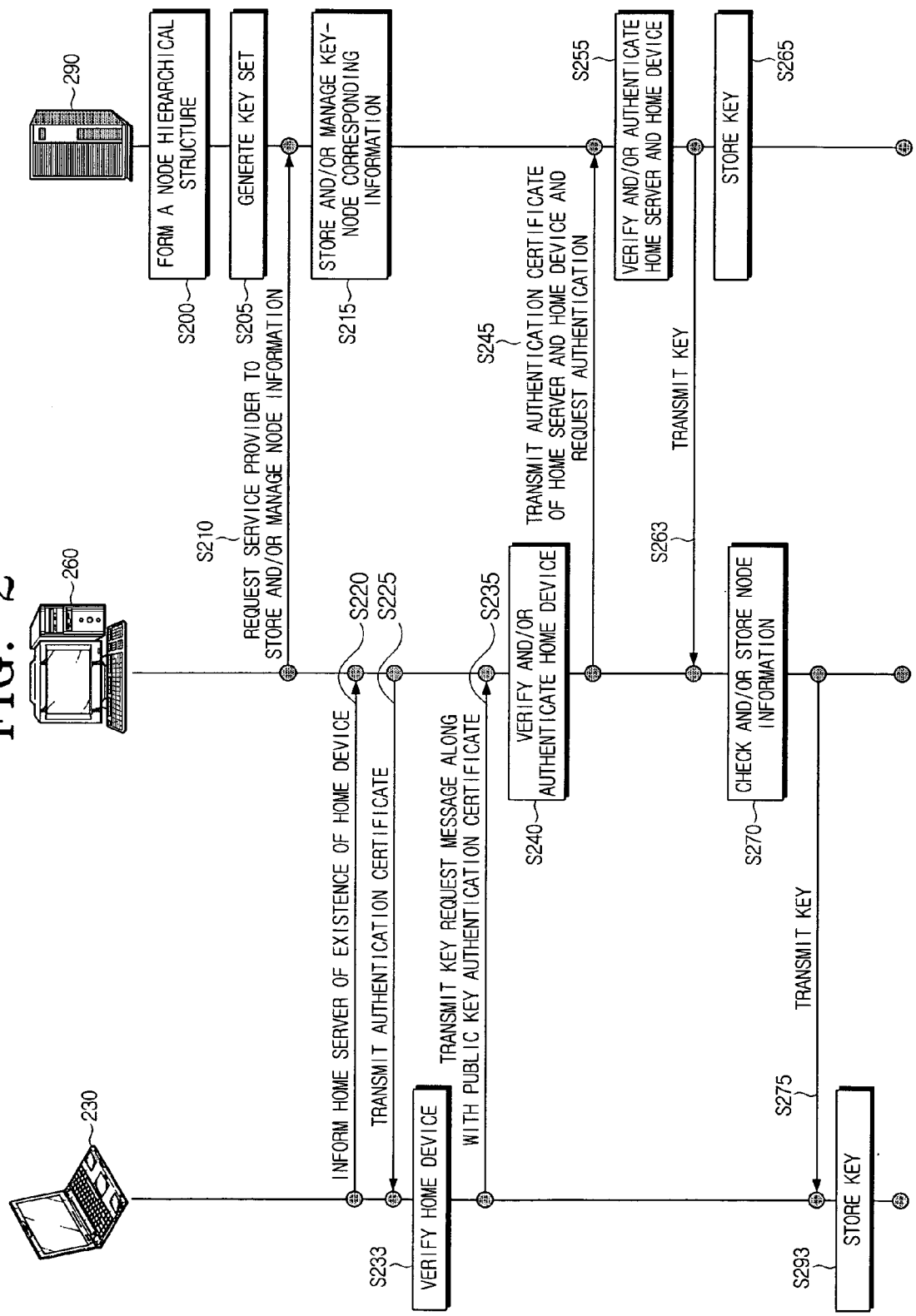

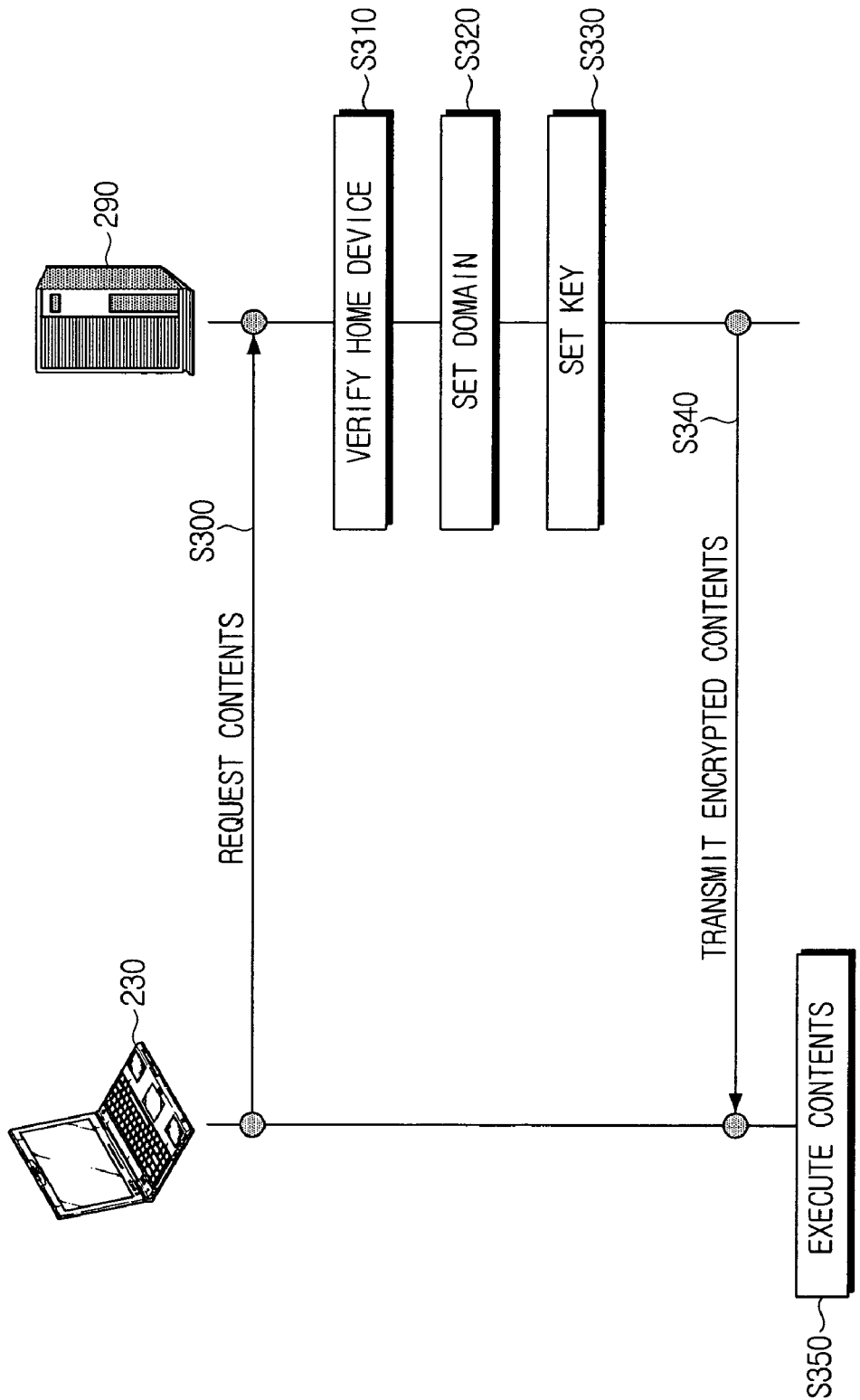

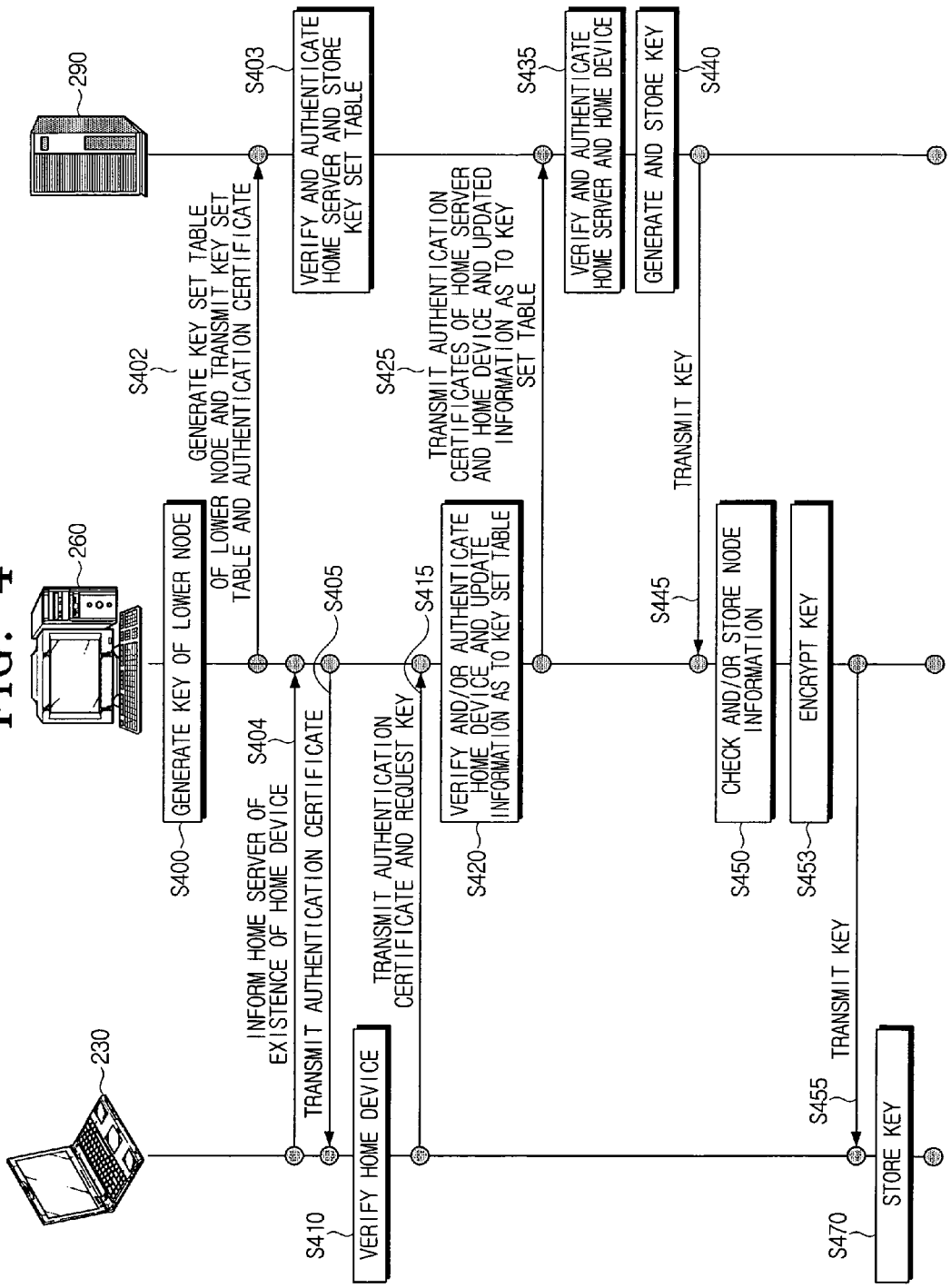

METHOD AND SYSTEM FOR MANAGING KEY OF HOME DEVICE IN BROADCAST ENCRYPTION (BE) SYSTEM

CROSS-REFERENCE TO RELATED APPLICATIONS

This application claims the benefit under 35 U.S.C. §119 (a) from Korean Patent Application No. 2005-52050 filed on Jun. 16, 2005 in the Korean Intellectual Property Office, the entire disclosure of which is hereby incorporated by reference.

BACKGROUND OF THE INVENTION

1. Field of the Invention

The present invention relates to a method for managing a key of a home device. More particularly, the present invention relates to a method and a system for managing a key of a home device in a broadcast encryption (BE) system 2. Description of the Related Art BE is a method of effectively transmitting information only to a desired set of users of the total number of users capable of receiving information from a transmitter, which is, for example, a broadcast center. Thus, the BE must be effectively used in a case of an arbitrary and dynamic variation in a set of users who is to receive information. An important property of the BE is to revoke or exclude an undesired device or user, for example, an illegal user or an expired user.

For this purpose, each device is allotted and stores a set of different keys, and a service provider stores a set of all keys of all devices. If a device to be excluded is determined, the service provider encrypts a temporal key using other keys except a key of the corresponding device, encrypts data to be transmitted using the temporal key, and broadcasts the encrypted temporal key and the encrypted data.

The device analyzes received data, selects a key to be used for decryption from the stored set of keys, decrypts the encrypted temporal key, and decrypts the encrypted data. A BE system adopts various techniques that have been suggested but generally adopts a hierarchical node structure.

In the BE, a transmission overhead, a storage overhead, and a computation overhead are important. The transmission overhead, the storage overhead, and the computation overhead respectively mean an amount of a header to be transmitted from a transmitter, an amount of secret keys to be stored by a user, and an amount of computation the user requires to obtain a session key. It is very important to reduce the transmission overhead.

In a BE system having a hierarchical structure according to the prior art, not the lower nodes of a home server to which a corresponding device belongs, but the leaf nodes that are lowermost nodes are randomly or in manufacturing order allocated to a specific device In other words, in a case where a service provider provides services only to devices controlled by a specific home server, devices except devices belonging to the home sever must be regarded as revoked devices.

According to the BE system having the hierarchical structure according to the prior art, in the worst case, for example, in a case where devices are uniformly distributed in each home server, data must be transmitted to devices using different keys. Thus, the transmission overhead of the BE system cannot be reduced.

SUMMARY OF THE INVENTION

Accordingly, exemplary embodiments of the present invention address the above-noted drawbacks, and an exemplary aspect of the present invention is to provide a method and a system for managing a key of a home device in a BE system capable of effectively allocating a node to a device inside the BE system so as to reduce a transmission overhead.

According to an exemplary aspect of the present invention, there is provided a method for managing a key of a service provider in a system comprising the service provider, a home server, and a home device. The method comprises forming a hierarchical structure of a group set comprising a plurality of nodes corresponding to the home server and a plurality of nodes corresponding to the home device, generating a key set to be allotted to the node set, and allowing the node group to correspond to the key set to generate key-node corresponding information according to a request of the home server.

According to another exemplary aspect of the present invention, there is provided a method for managing a key of a home server in a system comprising a service provider, the home server, and a home device. The method comprises receiving an authentication request of the home device, authenticating the home device depending on a verification of the home device; requesting the service provider for keys necessary for the home device, and allotting keys according to key-node corresponding information through the service provider to allot the necessary keys to the home device.

The service provider may transmit the keys to the home server and then to the home device to allot the keys to the home device.

The receiving of the authentication request of the home device may be performed after the home device authenticates the home server.

The method may further include requesting the service provider to authenticate the home device.

The keys allotted to the home device may be stored in the service provider.

If the home device is able to receive contents from the service provider, the verification of the home device may be performed According to still another exemplary aspect of the present invention, there is provided a system comprising a home server allotted a plurality of nodes and a home device connected to the plurality of nodes. The system comprises a member forming a hierarchical structure of a node group comprising the plurality of nodes corresponding to the home server and a plurality of nodes corresponding to the home device, and a member generating a key set to be allotted to the node group, allowing the node group to correspond to the key set according to a request of the home server, and generating the correspondence result as key-node corresponding information.

According to yet another exemplary aspect of the present invention, there is provided a system comprising a home server allotted a plurality of nodes, a home device connected to the plurality of nodes, and a service provider. The system comprises a member receiving an authentication request from the home device, verifying the home device, and requesting the service provider for keys necessary for the home device, and a member receiving keys depending on key-node corresponding information from the service provider to allot the keys to the home device.

The keys may be transmitted from the service provider to the home server and then from the home sever to the home device.

The home device may authenticate the home server and then request an authentication of the home device.

The home server may request the service provider to authenticate the home device.

The service provider may store the keys.

If the home device is able to receive contents from the service provider, the verifying of the home device may be performed.

According to yet another exemplary aspect of the present invention, there is provided a method for managing a key of a service provider in a system comprising the service provider, a home server, and a home device. The method comprises allotting a plurality of nodes to the home server, transmitting a key set table comprising keys allotted to the plurality of nodes; if the home device requests an authentication and then is verified by the home server, receiving information as to the key set table updated by the home serve; and if the home device having requested the authentication is verified by the service provider, allotting necessary keys to the home device.

According to yet another exemplary aspect of the present invention, there is provided a method for managing a key of a home server in a system comprising a service provider, the home server, and a home device. The method comprises storing a key set table comprising keys allotted to nodes allotted to the home server, verifying the home device according to a request of the home device connected to the nodes for an authentication, if the home device is verified, updating information as to the key set table, and transmitting the updated information as to the key set table to the service provider.

The keys transmitted from the service provider may be transmitted to the home device to allot the necessary keys to the home device.

The keys may be stored in the service provider.

If the home device is able to receive contents from the service provider, the verifying of the home device may be performed.

The key set table may be transmitted from the service provider.

The key set table may be stored during manufacturing of the home server.

The key set table may be generated by the home server.

According to yet another exemplary aspect of the present invention, there is provided a system comprising a home server allotted a plurality of nodes and a home device connected to the plurality of nodes. The system comprises a member storing a key set table comprising keys allotted to the plurality of nodes allotted to the home server, and if the home device is verified, a member authenticating the home device, updating information as to the key set table, and transmitting the updated information as to the key set table to the service provider.

The service provider may store the updated information as to the key set table.

The keys may be allotted to the service provider.

The service provider may store the key set table.

If the home device is able to receive contents from the service provider, the verifying of the home device may be performed.

The key set table may be transmitted from the service provider.

The key set table may be stored during manufacturing of the home server.

The key set table may be generated by the home server.

BRIEF DESCRIPTION OF THE DRAWINGS

The above aspects and features of the present invention will be more apparent by describing certain embodiments of the present invention with reference to the accompanying drawings, in which like reference numerals will be understood to refer to like parts, components and structures, where:

FIG. 2 is a flowchart of a method for managing a key of a home device in a BE system according to an exemplary embodiment of the present invention;

FIG. 3 is a view illustrating a process of using a home domain service in a BE system according to an exemplary embodiment of the present invention; and FIG. 4 is a flowchart of a method for managing a key of a home device in a BE system according to another exemplary embodiment of the present invention.

DETAILED DESCRIPTION OF EXEMPLARY EMBODIMENTS

Figure 1:
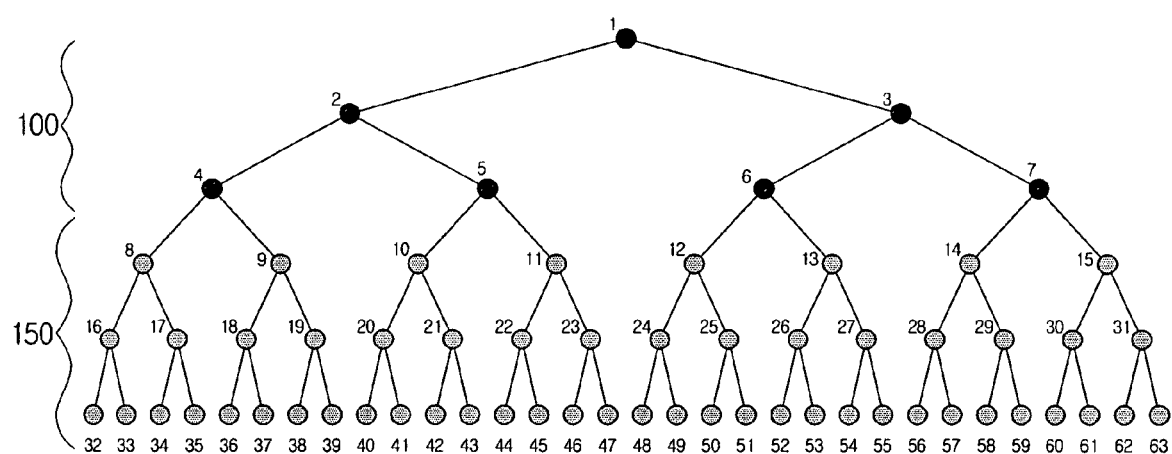
FIG. 1 is a view illustrating a structure of a BE system according to an exemplary embodiment of the present invention.

Certain exemplary embodiments of the present invention will be described in greater detail with reference to the accompanying drawings.

In the following description, as noted above, same drawing reference numerals are used for the same elements throughout the drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a view illustrating a structure of a BE system according to an exemplary embodiment of the present invention. A concept of the method for managing the key of the home device in the BE system according to the present invention will now be described with reference to FIG. 1.

The BE system according to certain exemplary embodiments of the present invention may be classified into two layers, that is an upper layer 100 and a lower layer 150.

Lowermost nodes 4, 5, 6, and 7 of the upper layer 100 are home servers, and lowermost nodes of the lower layer 150 are leaf nodes, that is, generally nodes 32, 33, ..., 62, and 63 to which a home device is connected.

The lowermost nodes (hereinafter referred to as D nodes) of the lower layer 150 respectively correspond to the lowermost nodes (hereinafter referred to as H nodes) of the upper layer 100. The D nodes of the lower layer 150 having the same H node as a root are regarded as nodes to which a home device belonging to the same home server is connected.

Keys are allocated to the nodes shown in FIG. 1. The nodes are respectively allotted keys 1, 2, 3, ..., and 63 K1, K2, K3, ..., and K63 according to their node numbers. Also, lower nodes have keys their upper nodes are allotted.

For example, the node 16 has the keys K1, K2, K4, K8, and K16, and the node 38 has the keys K1, K2, K4, K9, and K38.

If a device is allotted a lower node (one of a plurality of D nodes) allotted to a specific home server (one of a plurality of H nodes) and subscribes to or revokes specific service, a transmission overhead a service provider must transmit may be effectively reduced.

In other words, when devices in a specific home server are allotted D nodes, that is, randomly allotted the nodes 32, 43, and 54, the service provider must transmit a data packet including encrypted keys (used for decrypting provided contents) using the keys 32, 43, and 54.

In an exemplary implementation, the transmitted data packet may be expressed as "K32(K)*K43(K)*K54(K)*K (CONTENT)."

The node 32 having received the data packet obtains a key K (encrypting contents) using the key K32 thereof and decrypts contents using the key K. Also, the node 43 having received the data packet obtains a key K (encrypting contents) using the key 43 thereof and decrypts contents using the key K. The node 54 having received the data packet obtains a key K (encrypting contents) using the key 54 thereof and decrypts contents the key K.

However, if devices in the specific home server are not randomly allotted D nodes but allotted the nodes 32, 34, and 36 that are D nodes under the specific home server, the service provider transmits a data packet including keys (used for decrypting provided contents) encrypted with the key 4.

For example, the transmitted data packet may be expressed as "K4(K)*K(CONTENT)." The nodes 32, 34, and 36 having received the data packet obtain the key K (used for encrypting contents) using their key K4 and decrypt contents using the key K.

In other words, if the devices in the specific home server are allotted D nodes in the specific home server not randomly, a transmission overhead of a header the service provider must transmit is considerably reduced.

Also, if the service provider desires to revoke the use of a service by the node 36, the service provider transmits a data packet including keys encrypted with the key 8 to deprive the node 36 of an access to the service.

For example, the transmitted data packet may be expressed as "K8(K)*K(CONTENT)." The nodes 32 and 34 having received the data packet obtain the key K (used for encrypting contents) using their key K8 and decrypt contents using the key K.

However, since the node 36 does not have the key K8, the node 36 may not obtain the key K (used for encrypting contents) and thus may not use contents.

FIG. 2 is a flowchart of a method for managing a key of a home device in a BE system according to an exemplary embodiment of the present invention.

The BE system according to an exemplary embodiment of the present invention may include a home device 230, a home server 260, and a service provider 290. The BE system may have a hierarchical structure.

In the present invention, in a case where a D node allotted to an H node that is the home server 260 is allotted to the home device 230 to grant or restrict an access to contents provided from the service provider 290 of the home device 230 in the home server 260, a transmission overhead of a header the service provider 290 must transmit can be efficiently reduced.

In other words, if a key allotted to the home server 260 to which the home device 230 belongs and a key allotted to a lower node of the home server 260 are appropriately used, an access of the home device 230 in the home server 260 to contents may be adjusted."

The method for managing the key of the home device in the BE system according to an exemplary embodiment of the present invention will now be described with reference to FIGS. 1 and 2.

A key allotted to each node that will be described in exemplary embodiments of the present invention is generally generated by the service provider 290 and then provided to the home device 230.

In operation S200, the service provider 290 forms an entire node hierarchy structure. In operation S205, the service provider 290 randomly generates a set of keys to be allotted to nodes. If a home server manufacturing company and the home server 260 requests the service provider 290 to store and/or manage node information in operation S210, the service provider 290 stores and/or manages the node information (or device information) corresponding to the home server 260 so as to correspond to the set of keys in operation S215.

The node information corresponding to the set of keys is called key-node corresponding information.

The home server 260 has a key thereof and keys allotted to upper nodes thereof. For example, the H node 4 shown in FIG. 1 has keys allotted to the nodes 1 and 2 and the H node 4.

The homer server manufacturing company stably stores these keys in the home server 260 in the manufacture of the home server 260. The home server 260 and the home device 230 have public key authenticated certificates authenticated by the service provider and corresponding private keys.

In operation S220, the home device 230 belonging to the home server 260 and desiring to receive a key transmits a message for informing the home server 260 of an existence thereof to the home server 260. In operation S225, the home server 260 transmits the public key authenticated certificate authenticated by the service provider 290 to the home device 230.

In operation S233, the home device 230 verifies the home server 260 through the public key authenticated certificate. In operation S235, the home device 230 transmits a key request message along with the public key authenticated certificate thereof to the home server 260.

In operation S240, the home server 260 verifies and authenticates the home device 230 through the public key authenticated certificate. In operation S245, the home server 260 transmits an authentication certificate of the home server 260 and an authentication certificate of the home device 230 to the service provider 290 and requests the service provider 290 to authenticate the home device 230.

In operation S255, the service provider 290 verifies and authenticates the home server 260 and the home device 230 through the authentication certificates. Here, a process of verifying the home device 230 is to verify whether a key of the home device 230 is a model having been exposed, a service for corresponding contents has been revoked, and the home device 230 is a device that has been missed and/or robbed.

If the service provider 290 is not able to authenticate the home server 260 and the home device 230, the service provider 290 may delete a key set of the home device 230 and a registration of the home device 230.

In operation S263, the service provider 290 transmits a key requested by the home device 230. In operation S265, the service provider 290 stores information as to the home device 230 and node information together with information as to the transmitted key.

In operation S270, the home server 260 receives the key and checks and stores the node information relates to the key. In operation S275, the home server 260 transmits the key to the home device 230. In operation S293, the home device 230 receives and stores the key.

A process of executing contents provided from the service provider 290 in the home device 230 will now be described.

FIG. 3 is a flowchart of a process of using a home domain service in a BE system according to an embodiment of the present invention. Referring to FIG. 3, in operation S230, the home device 230 having stored the key as described with reference to FIG. 2 requests the service provider 290 for corresponding contents.

The service provider 290 verifies the home device 230 in operation S310 and sets a corresponding domain in operation S320.

In operation S330, the service provider 290 sets keys of lower layers belonging to an H node of the corresponding domain. Here, the keys are set according to a scheme of the BE system having the H node as a root node. In operation S340, the service provider 290 transmits contents encrypted using the keys set in operation S330 to the home device 230.

In operation S350, the home device 230 receives the encrypted contents, decrypts the encrypted contents using a key thereof, and executes the corresponding contents.

As described above, in the method for managing the key of the home device in the BE system according to the present invention, D nodes connected to a home server can be allotted in advance so as to efficiently manage granting and revoking of accesses of home devices respectively connected to the D nodes with respect to contents using a key allotted to the home server.

Accordingly, a domain encryption key (DEK) may be allotted as a secret key to the home server to achieve the object of the present invention The DEK may be used to encrypt and transmit a content encryption key (CEK) and updated periodically or depending on a variation in a structure of a home device and a usage state of contents.

A method for managing a key of a home device in a BE system according to another exemplary aspect of the present invention will now be described.

FIG. 4 is a flowchart of a method for managing a key of a home device in a BE system according to another embodiment of the present invention.

In operation S400, the home server 260 generates a key of a lower node thereof. In operation S402, the home server 260 generates a key set table for the lower node and transmits the key set table along with an authentication certificate thereof to the service provider 290. In operation S403, the service provider 290 verifies and authenticates the home server 260 through the authentication certificate and stores the key set table.

For example, the key set table may include keys allotted to nodes allotted to the home server 260, be transmitted from the service provider 290, and be stored in the manufacture of the home server 260.

In operation S404, the home device 230 belonging to the home server 260 and desiring to receive a key transmits a message for informing the home server 260 of an existence thereof. In operation S405, the home server 260 transmits a public key authentication certificate authenticated by the service provider 290 to the home device 230.

The home device 230 verifies the home server 260 through the authentication certificate in operation S410 and transmits a key request message along with an authentication certificate in operation S415.

In operation S420, the home server 260 verifies the home device 230 through the authentication certificate, authenticates the home device 230, and updates information as to the key set table. The service provider 290 may identify the home device 230 having transmitted the key request message through updating of the information as to the key set table.

In operation S425, the home server 260 transmits the authentication certificates of the home server 260 and the home device 230 to the service provider 290 together with the updated information as to the key set table.

In operation S435, the service provider 290 verifies and authenticates the home server 260 and the home device 230 through the authentication certificates.

The service provider 290 generates a key requested by the home device 230 through the updated information as to the key set table and stores the key in operation S440 and transmits the key to the home server 260 in operation S445.

The home server 260 receives the key and checks and stores node information related to the key in operation S450 and encrypts the key in operation S453.

In operation S455, the home server 260 transmits the key to the home device 230. In operation S470, the home device 230 stores the key.

A process of executing contents provided from the service provider 290 in the home device 230 is analogous to the above-described process.

As described above, in a method and a system for managing a key of a home device in a BE system according to exemplary embodiments of the present invention, the home device belonging to a home server can subscribe to or revoke a service so as to reduce a transmission overhead of a header of a service provider.

The foregoing embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for managing a key of a home server in a system comprising a service provider, the home server, and a home device, the method comprising:
    receiving an authentication request of a home device;
    authenticating the home device depending on a verification of the home device;
    requesting a service provider for keys for the home device;
    allotting keys according to key-node corresponding information through the service provider to allot the keys to the home device, such that the home device is allotted its respective key and a key of at least one upper node that corresponds to the home device;
    transmitting, to the home device and a second home device, encrypted content of a desired service that is encrypted with a key of a first upper node, wherein the first upper node corresponds to an upper node of the home device and the second home device;
    determining to revoke the service provided to the second device; and
    in response to determining to revoke the service provided to the second device, transmitting, to the home device, encrypted content of the desired service that is encrypted with a key of a second upper node that corresponds to an upper node of the home device and corresponds to a lower node of the first upper node.

2. The method of claim 1, wherein the service provider transmits the keys to a home server and to the home device to allot the keys to the home device.

3. The method of claim 1, wherein the receiving of the authentication request of the home device is performed after the home device authenticates the home server.

4. The method of claim 1, further comprising requesting the service provider to authenticate the home device.

5. The method of claim 1, wherein the keys allotted to the home device are stored in the service provider.

6. The method of claim 1, wherein, if the home device receives contents from the service provider, the verification of the home device is performed.

7. A system comprising:
    a home server allotted a plurality of nodes;
    a home device connected to the plurality of nodes;
    a service provider;
    a member receiving an authentication request from the home device, verifying the home device, and requesting the service provider for keys necessary for the home device; and a member receiving keys depending on key-node corresponding information from the service provider to allot the keys to the home device, such that the home device is allotted its respective key and a key of at least one upper node that corresponds to the home device, wherein the home server transmits, to the home device and a second home device, encrypted content of a desired service that is encrypted with a key of a first upper node, wherein the first upper node corresponds to an upper node of the home device and the second home device, the service provider determines to revoke the service provided to the second device, and in response to the service provider determining to revoke the service provided to the second device, the home server transmits, to the home device, encrypted content of the desired service that is encrypted with a key of a second upper node that corresponds to an upper node of the home device and corresponds to a lower node of the first upper node.

8. The system of claim 7, wherein the keys are transmitted from the service provider to the home server and from the home sever to the home device.

9. The system of claim 7, wherein the home device authenticates the home server and then requests an authentication of the home device.

10. The system of claim 7, wherein the home server requests the service provider to authenticate the home device.

11. The system of claim 7, wherein the service provider stores the keys.

12. The system of claim 7, wherein, if the home device receives contents from the service provider, the verifying of the home device is performed.

* * * * *